Figure 1:
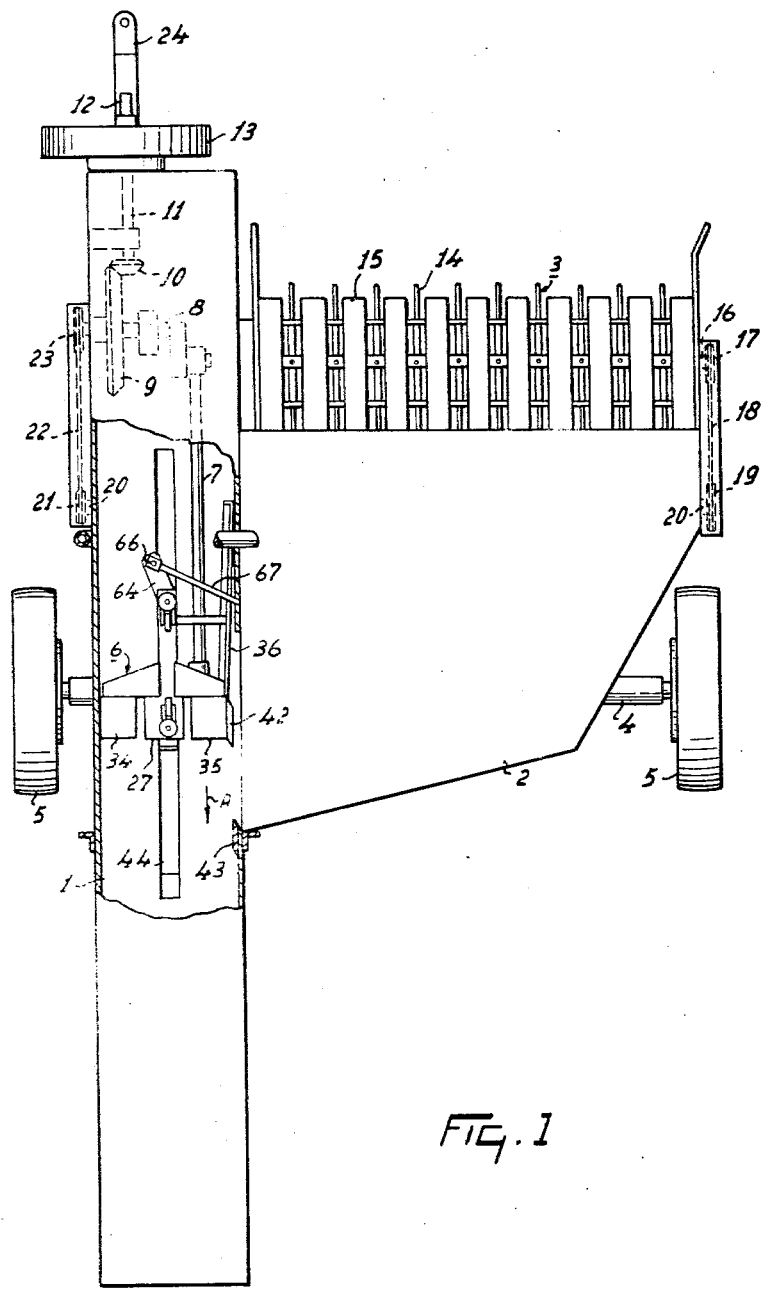

May 3, 1966 C. VAN DER LELY 3,249,040
RAM-TYPE BALING MACHINES
Filed June 26, 1964 2 Sheets-Sheet 1

INVENTOR.
CORNELIS VAN DER LELY
BY
Mason, Mason & Albright
Attorneys

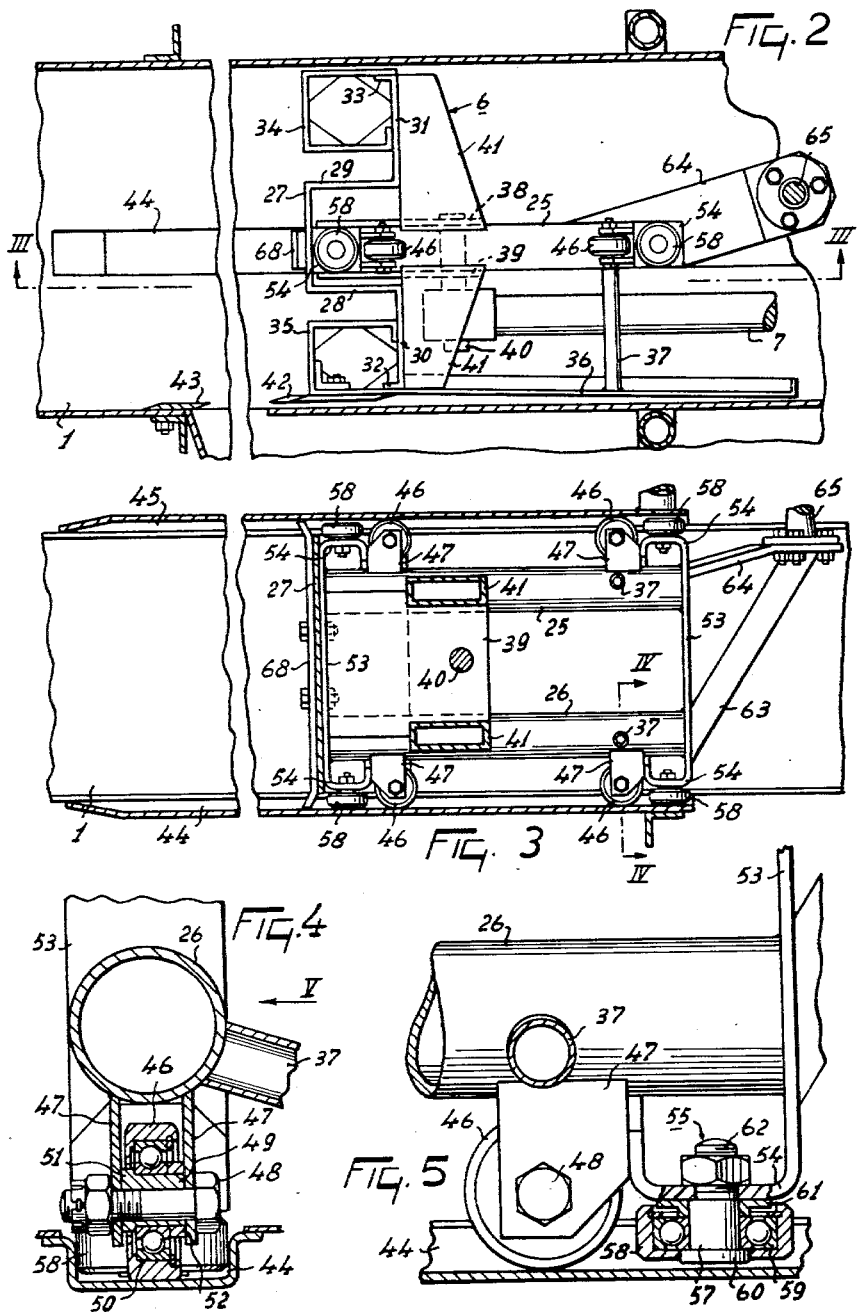

United States Patent Office 3,249,040
Patented May 3, 1966

3,249,040
RAM-TYPE BALING MACHINES
Cornelis van der Lely, Zug, Switzerland, assignor to Patent Concern N.V., Willemstad, Curacao, Netherlands Antilles, a limited-liability company of the Netherlands Antilles
Filed June 26, 1964, Ser. No. 378,268
Claims priority, application Netherlands, July 4, 1963, 294,933
12 Claims. (Cl. 100—179)

This invention relates to ram-type baling machines of the kind comprising a baling chamber in which a ram is reciprocably movable, the ram being guided in the chamber by means including rollers.

An object of the invention is to improve the efficiency of the guide means in such a way that a simple, effective and relatively light-weight construction is obtained.

According to the invention, there is provided a baling machine of the kind set forth, wherein the rollers are mounted solely at two relatively opposite sides of the ram.

For a better understanding of the invention, and to show how the same may be carried into effect, reference will now be made, by way of example, to the accompanying drawings, in which:

FIGURE 1 is a plan view in partial section of a baling machine in accordance with the invention, FIGURE 2 is a fragmentary sectional plan view showing certain parts visible in FIGURE 1 to an enlarged scale and in greater detail, FIGURE 3 is a section taken on the line III—III of FIGURE 2, FIGURE 4 is a section, to an enlarged scale, taken on the line IV—IV of FIGURE 3, and FIGURE 5 is a view as seen in the direction indicated by the arrow of V of FIGURE 4.

Referring to the drawings, the machine which is illustrated is a ram-type pickup baler having a bale or baling chamber 1, a feeding chamber 2 and a pickup unit 3 located in front of the chamber 2 relative to the intended direction of travel of the implement. The baler is supported on the ground by two wheels 5 mounted at opposite ends of an axle 4. A ram or plungerhead 6 is reciprocably housed in the baling chamber 1 and is linked by a connecting rod or pitman 7 to the crank pin of a rotatable crankshaft 8 located towards the leading end of the chamber 1. The teeth of a bevel pinion 9 secured to the crankshaft 8 mesh with those of a relatively smaller bevel pinion 10 secured to one end of a rotatable shaft 11 that extends parallel or substantially parallel to the longitudinal axis of the chamber 1. The free leading end 12 of the shaft 11 is provided with means (not shown), such as splines, to enable it to be placed in driven connection with the power take-off shaft of a tractor or other propelling and operating vehicle. A flywheel 13 is secured to the shaft 11 immediately to the rear of its leading end 12.

The pickup unit 3 has a central rotatable shaft 16 to which a plurality of resilient tines 14 are connected. The tines 14 are arranged in groups and each group passes, during its rotation, through a corresponding slot in a sheath 15, the slots acting to strip hay or other crop from the tines 14 after being displaced thereby. The end of the central shaft 16 remote from the chamber 1 carries a pulley 17 which is in driven connection with a further pulley 19 by way of an endless rope, belt or the like 18. The pulley 19 is fastened to one end of a rotatable shaft 20 whose opposite end carries a further pulley 21 that is in driven communication with a pulley 23 by way of an endless rope, belt or the like 22. The pulley 23 is secured to one end of the crankshaft 8. A draw-bar 24 is adjustably connected to the leading end of the pickup baler adjacent the shaft 11 and is adapted to be connected in known or other suitable manner to the tow-bar or hitch of a tractor or other propelling vehicle.

The ram or plungerhead 6 includes two tubular beams 25 and 26 (FIGURES 3, 4 and 5) that extend parallel to the direction of reciprocation of the ram. At that end of the ram which actually forces hay or other crop longitudinally of the chamber 1 during use of the baling machine, that is to say, the rearmost end thereof relative to the intended direction of travel of the machine, a plate 27 is perpendicularly secured to the corresponding ends of the two beams 25 and 26. As can be seen in FIGURE 2, the plate 27 is integral with two further plates 28 and 29 that extend parallel to the beams 25 and 26 on relatively opposite sides thereof. The edges of the two plates 28 and 29 remote from the plate 27 are respectively integral with, or secured to, further plates 30 and 31 that extend parallel to the plate 27. The plates 30 and 31 extend respectively towards opposite sides of the chamber 1 and their respective edges 32 and 33 located closest to said opposite sides are bent over perpendicularly from the major portions of the plates so as to extend parallel to said sides in the direction of the plane containing the plate 27. Three integral or rigidly interconnected plates form, together with the plate 31, a vertically extending sleeve 34 of rectangular cross-section, said plates being secured to the plate 31 which forms one of the sides of said sleeve. A similar sleeve 35 is fastened to the plate 30 but, in this case, the sleeve 35 has an extension 36 that projects therefrom in a direction substantially parallel to the intended direction of travel of the baling machine. The extension 36 is arranged to close the opening by which the feeding chamber 2 communicates laterally with the baling chamber 1 at times when the ram or plungerhead 6 is moving towards the shaft 11 after having completed a compression stroke. The extension 36 prevents hay or other crop from being fed behind the ram or plungerhead 6. Stiffening struts 37 interconnect the extension 36 and the beams 25 and 26.

Two vertical plates 38 and 39 interconnect the beams 25 and 26 at the ends thereof adjacent the plate 27 and support a horizontal gudgeon pin 40. The "little end" of the connecting rod or pitman 7 is pivotally engaged around the gudgeon pin 40. Supports 41 of rectangular cross-section interconnect the beams 25 and 26 and the plates 30 and 31. A vertical blade 42 is fastened to one side of the sleeve 35 and is arranged to co-operate with a further vertical blade 43 fastened to the inner side of the wall of the baling chamber 1.

The lower and upper sides of the baling chamber 1 are provided with paths or guides for rollers carried by the ram or plungerhead 6, said guides taking the form of grooves 44 and 45 of channel-shaped cross-section. Four rollers 46 that are arranged so as to be rotatable about substantially horizontal axes co-operate with the grooves 44 and 45 and, as can be seen in FIGURE 3 of the drawings, two of the rollers 46 are mounted at opposite ends of the beam 25 and the other two at opposite ends of the beam 26. Pairs of supporting lugs 47 (FIGURES 3, 4 and 5) project upwardly and downwardly respectively from the beams 25 and 26 towards the opposite ends thereof and carry horizontally disposed bolts 48 upon which the rollers 46 are mounted. Each bolt 48 is surrounded by an eccentric sleeve 49 around the longitudinal axis of which the corresponding roller 46 is rotatable with the aid of a ball bearing 50. As can be seen in FIGURE 4 of the drawings, each ball bearing 50 is sandwiched between a shoulder 51 of the corresponding sleeve 49 and a ring 52 surrounding said sleeve. The distance of the axis of rotation of each roller 46 from the corresponding beam 25 or 26 is determined by the angular setting of the longitudinal axis of the sleeve 49 about that of the corresponding bolt 48. It will be apparent that the various settings can be changed readily by loosening the bolts 48, turning the sleeves 49 therearound to the required positions and re-tightening the bolts 48 to prevent further turning of the sleeves 49.

The corresponding ends of the two beams 25 and 26 are interconnected by vertically extending strips 53 the upper and lower ends 54 of which are bent over horizontally so that they can carry four substantially vertically disposed bolts 55. As can be seen in FIGURE 5 of the drawings, the bolts 55 are shouldered so that they have portions 57 which project above or below the hole in the corresponding end 54, each portion 57 having a roller 58 rotatably arranged around it with the aid of a ball bearing 59. Each ball bearing 59 is sandwiched between a head 60 formed on the corresponding bolt 55 and a shouldered spacing washer 61 that bears against the end 54. It can be seen from FIGURE 5 that the bolts 55 are of eccentric formation, the longitudinal axis of the portion 57 surrounded by the roller 58 being eccentric with respect to that of a screw-threaded portion 62 which is entered through the hole in the end 54. It will be evident that the settings of the axes of rotation of the rollers 58 laterally of the grooves 44 and 45 can be changed by loosening the nuts of the bolts 55, turning said bolts about the axes of the portions 62 until the required settings are reached and finally re-tightening the nuts to prevent further turning movements.

Two inclined beams 63 and 64 (FIGURE 3) project from the end of the ram or plunger 6 closest to the shaft 11 and carry a substantially vertical support 65 whose uppermost end takes the form of a vertical pivot pin 66. This pin is located approximately mid-way between the opposite lateral sides of the ram or plunger 6. A coupling rod 67 has one of its ends pivotally mounted on the pin 66 and its opposite end connected to a feeding device (not illustrated) that is arranged to deliver crop collected by the pickup unit 3 to the baling chamber 1 during use of the baling machine. The feeding device is, of course, located within the feeding chamber 2.

During use of the baling machine, it is towed over the ground by a tractor or other propelling vehicle, the shaft 11 being rotated by drive derived from the power take-off shaft of that vehicle. The ram or plungerhead 6 reciprocates in the baling chamber 1 performing crop compressing strokes in the direction indicated by the arrow A in FIGURE 1 and return strokes in a relatively opposite direction. Hay or other crop is fed by the aforementioned feeding device into the baling chamber 1 in advance of the ram or plungerhead 6 through the lateral opening connecting that chamber with the feeding chamber 2. As the ram or plungerhead 6 reaches the end of a compression stroke in the direction A, the blade 42 carried thereby slides over the relatively fixed blades 43 thus cutting off crop already in the chamber 1 from further crop in the chamber 2 which is about to be fed into the chamber 1. The formation of the ram or plungerhead 6 from a pair of centrally mounted beams 25 and 26 and a few rectangularly profiled plates 27 and 31 makes the said ram or plungerhead 6 very strong but of relatively light weight.

The guide rollers 46 and 58 enable the stroke of the ram or plungerhead 6 to be maintained without lateral variance which is important for efficient operation of the baling machine and particularly in respect of satisfactory co-operation of the two blades 42 and 43. The arrangement of the rollers centrally above and below the ram or plungerhead 6 enables a minimum number of rollers to be employed with a consequent simplification of the construction of the ram or plunger 6. This simplification is particularly evident when, as in the case which has been described, the rollers are arranged in groups of two adjacent the opposite ends of the ram or plungerhead 6, each group including one roller 46 arranged to rotate about a horizontal or substantially horizontal axis and one roller 58 arranged to rotate about a vertical or substantially vertical axis.

A vertical strip 68 (FIGURES 2 and 3) is bolted to the crop-contacting side of the plate 27 and has its upper and lowermost ends inclined forwardly relative to the direction A and shaped to fit in the grooves 45 and 44 respectively. It will be apparent that, during use of the baling machine, the bent-over ends which have just been mentioned precede the rollers 58 and 46 along the grooves 44 and 45 and displace any accumulations of crop or dirt which might interfere with the co-operation of the grooves and rollers. It can also be seen in FIGURE 3 of the drawings that the ends of the grooves 44 and 45 are gently bevelled inwardly of the chamber 1 so that there are no recesses at these points in which crop or dirt would be likely to accumulate. The fact that the grooves 44 and 45 take the form of outward depressions in the walls of the chamber 1 tends to prevent blockage of the supply of the hay or other crop which would be more likely to occur if the guides afforded by the grooves were to project inwardly of the chamber 1.

The connecting rod or pitman 7 is coupled to the ram or plungerhead 6 at a point spaced laterally of the center of the latter, said point being located towards the side of the ram or plungerhead 6 closest to the feeding chamber 2. It has been found that this arrangement reduces the stresses to which the various moving parts are subjected due to the fact that the resultant of the forces which resist movement of the ram or plungerhead 6 in the direction A acts on said ram or plungerhead 6 at a point spaced from its center towards the feeding chamber 2. The arrangement of the pivot pin 66 approximately midway between the opposite lateral sides of the ram or plungerhead 6 also reduces the stresses which the various moving parts must withstand in comparison with the conventional arrangement in which a link between the ram or plungerhead 6 and a feeding device is connected to said ram or plungerhead 6 at the side thereof facing the feeding chamber 2.

It can be seen in FIGURE 2 of the drawings that both the blades 42 and 43 are formed with two relatively opposite cutting edges and that said blades are secured to the sleeve 35 and baling chamber 1 respectively by screw-threaded bolts or studs. Accordingly, once one or both of the cutting edges that are being used becomes blunt, the blades 42 and 43 can each be reversed to bring a new cutting edge into use before eventual re-sharpening is necessary. Minor adjustments of the position of the ram or plungerhead 6 can be made accurately by resetting the eccentrically mounted rollers 46 and 58 in the manner previously described.

Having thus described my invention, what I claim is new and desire to secure by Letters Patent of the United States is:

1. In a baler for baling hay and other crop, which includes a reciprocating plungerhead and a baling chamber, with walls receiving said plungerhead, at least one pair of rollers being mounted on relatively opposite sides of said plungerhead substantially near the longitudinal center line thereof, path means being provided and disposed substantially centrally on the walls of said baling chamber, the said respective path means comprising elongated grooves, formed in the corresponding walls of said baling chamber, said rollers being received by said grooves and being guided thereby when said plungerhead is reciprocated.

2. Apparatus in accordance with claim 1, wherein two pairs of rollers are mounted on both the top and the bottom of said plungerhead, said path means receiving said rollers.

3. Apparatus in accordance with claim 1, wherein there are two pairs of rollers mounted on said plungerhead at each opposite end of the top thereof and at each opposite end of the bottom thereof.

4. In a baler for baling hay or other crop which includes a plungerhead reciprocating in a baling chamber with walls, receiving said plungedhead, at least one pair of rollers being mounted on opposite sides of said plungerhead substantially near the longitudinal center line thereof, path means being provided and disposed substantially centrally on the walls of said baling chamber, the said respective path means comprising elongated grooves, formed in the corresponding walls of said baling chamber said rollers of a pair being adjacent to each other, one of said rollers being rotatable about a substantially vertical axis, the other of said rollers being rotatable about a substantially horizontal axis, said rollers being received by said grooves and being guided thereby when said plungerhead is reciprocated.

5. Apparatus in accordance with claim 4, wherein a pair of rollers is mounted each on the top and the bottom of said plungerhead, and said grooves receiving said rollers being disposed on the upper and lower walls of said baling chamber.

6. Apparatus in accordance with claim 5, wherein a pair of rollers is mounted on said plungerhead at each opposite end of the top thereof and at each opposite end of the bottom thereof.

7. Apparatus in accordance with claim 5, wherein said rollers rotatable about a substantially horizontal axis on said top of said plungerhead are interposed between those rollers rotatable about a substantially vertical axis on said top and said rollers rotatable about a substantially horizontal axis on said bottom of said plungerhead are interposed between those rollers rotatable about a substantially vertical axis on said bottom.

8. Apparatus in accordance with claim 7, wherein one end of said grooves in the walls of said baling chamber is beveled and merges into the wall of said chamber.

9. In a baler for bailing hay or other crop, which includes a reciprocating plungerhead and a baling chamber, with walls receiving said plungerhead, at least one pair of rollers being mounted on bath relatively opposite sides of said plungerhead, guide means in both opposite walls of said baling chamber, the said respective guide means comprising elongated grooves formed in the corresponding walls of said baling chamber, said rollers received by said grooves and being guided thereby when said plungerhead is reciprocated, clearing means connected to the back of said plungerhead and received by said grooves, whereby when said plungerhead reciprocates, said clearing means traverses said grooves and maintains same substantially clear of crop and other material.

10. Apparatus in accordance with claim 9, wherein said clearing means comprises a strip with opposite ends profiled to fit in said grooves.

11. Apparatus in accordance with claim 9, wherein the ends of said strip are inclined rearwardly from said plungerhead.

12. In a baler for baling hay or other crop, which includes a reciprocating plungerhead and a baling chamber with walls receiving said plungerhead, at least one pair of rollers being mounted on relatively opposite sides of said plungerhead substantially near the longitudinal center line thereof, path means being provided and disposed substantially centrally on the walls of said baling chamber, said respective path means comprising elongated grooves formed in the corresponding walls of said baling chamber, said rollers received by said grooves and being guided thereby when said plungerhead is reciprocated, said plungerhead comprising a front portion for contacting the crop to be baled, a pair of parallel vertically spaced beams, connected on the center of the back of said plungerhead and extending substantially in the direction of reciprocation of the plungerhead, said pairs of rollers being mounted on each of said beams.

References Cited by the Examiner
UNITED STATES PATENTS

| | | | |
|---|---|---|---|
| 1,990,029 | 2/1935 | Isabella. | |
| 2,428,672 | 10/1947 | McClellan et al. | 100—179 |
| 2,720,160 | 10/1955 | Tice et al. | 100—98 |
| 2,923,230 | 2/1960 | Bornzin | 100—98 |
| 3,059,569 | 10/1962 | Nolt | 100—98 |

FOREIGN PATENTS

| | | |
|---|---|---|
| 232,876 | 2/1961 | Australia. |
| 846,395 | 8/1960 | Great Britain. |
| 874,664 | 8/1961 | Great Britain. |

WALTER A. SCHEEL, *Primary Examiner.*

BILLY J. WILHITE, *Examiner.*